United States Patent
Anafi et al.

[11] Patent Number: 5,362,956
[45] Date of Patent: Nov. 8, 1994

[54] PISTON ERROR SENSOR FOR PHASED OPTICAL ARRAYS

[75] Inventors: David Anafi, West Palm Beach; James M. Spinhirne, North Jupiter, both of Fla.

[73] Assignee: United Technologies Corporation, Hartford, Conn.

[21] Appl. No.: 487,775

[22] Filed: Apr. 22, 1983

[51] Int. Cl.$^5$ .............................................. G01J 1/20
[52] U.S. Cl. .................................. 250/201.9; 356/349
[58] Field of Search ................ 356/5, 349, 360, 363, 356/4.5; 250/201 R, 201.9

[56] References Cited

U.S. PATENT DOCUMENTS 3,825,845  7/1974  Angelbeck et al. ............... 332/7.51
4,295,741 10/1981  Palma et al. ......................... 250/201

OTHER PUBLICATIONS

J. E. Pearson, Optical Engineering, vol. 15, No. 2, Mar.-Apr. 1976, p. 151.

Primary Examiner—Stephen C. Buczinski

[57] ABSTRACT

The piston error problem in a multi-laser optical system having a plurality of parallel component beams is solved by a control loop that responds to a path length difference signal generated by the interference of two of the component beams to adjust one of a set of adjustable component mirrors to reduce the path length difference.

2 Claims, 2 Drawing Sheets

PISTON ERROR SENSOR FOR PHASED OPTICAL ARRAYS

TECHNICAL FIELD

The invention relates to a device for controling piston error in large diameter output beams for an optical system which employs mirrors which have a number of separate elements that are independently adjustable.

BACKGROUND ART

In the field of adaptive optics, in which a deformable mirror is adjusted in order to maintain the quality of an output beam in order to compensate for thermal or other distortions, a great deal of work has been done in sensing the quality of an output beam and adjusting the deformable mirror in order to produce the output beam with a desired configuration. A standard tool has been the Hartman sensor in which a number of lenses focus small samples of the beam onto a corresponding number of detectors, typically an array of quadrant optical detectors. Comparison of the sample beam with a reference beam permits a deformable or adjustable mirror to be adjusted in order to align the wavefront of the output beam correctly. A convenient reference on Hartmann sensors is contained in D. Malacara, "Hartmann Test of Aspherical Mirrors", *APPLIED OPTICS*, Volume II, Page 99, 1972.

The art of adaptive optics has not yet solved the "piston" problem in which a number of separate beams are combined on a large mirror which itself is made up from a number of smaller mirror elements. In order to produce a high quality output beam, the separate mirror elements must be aligned so that the output beam has the same tilt as the reference beam and also so that the path lengths through the system that strike each separate mirror element are exactly equal for all portions of the mirror. The situation in which the several sub-beams are correctly aligned in angle but have phases that differ is known as the piston problem.

DISCLOSURE OF INVENTION

The invention relates to a simple technique for path length control for different portions of a multi-element mirror so that an array of sub-beams that are aligned in angle may be also aligned for path length, in which a supplementary detector receives radiation from two beams and produces a discriminant from the interference signal of the beams.

BEST MODE FOR CARRYING OUT THE INVENTION

Figure 1:
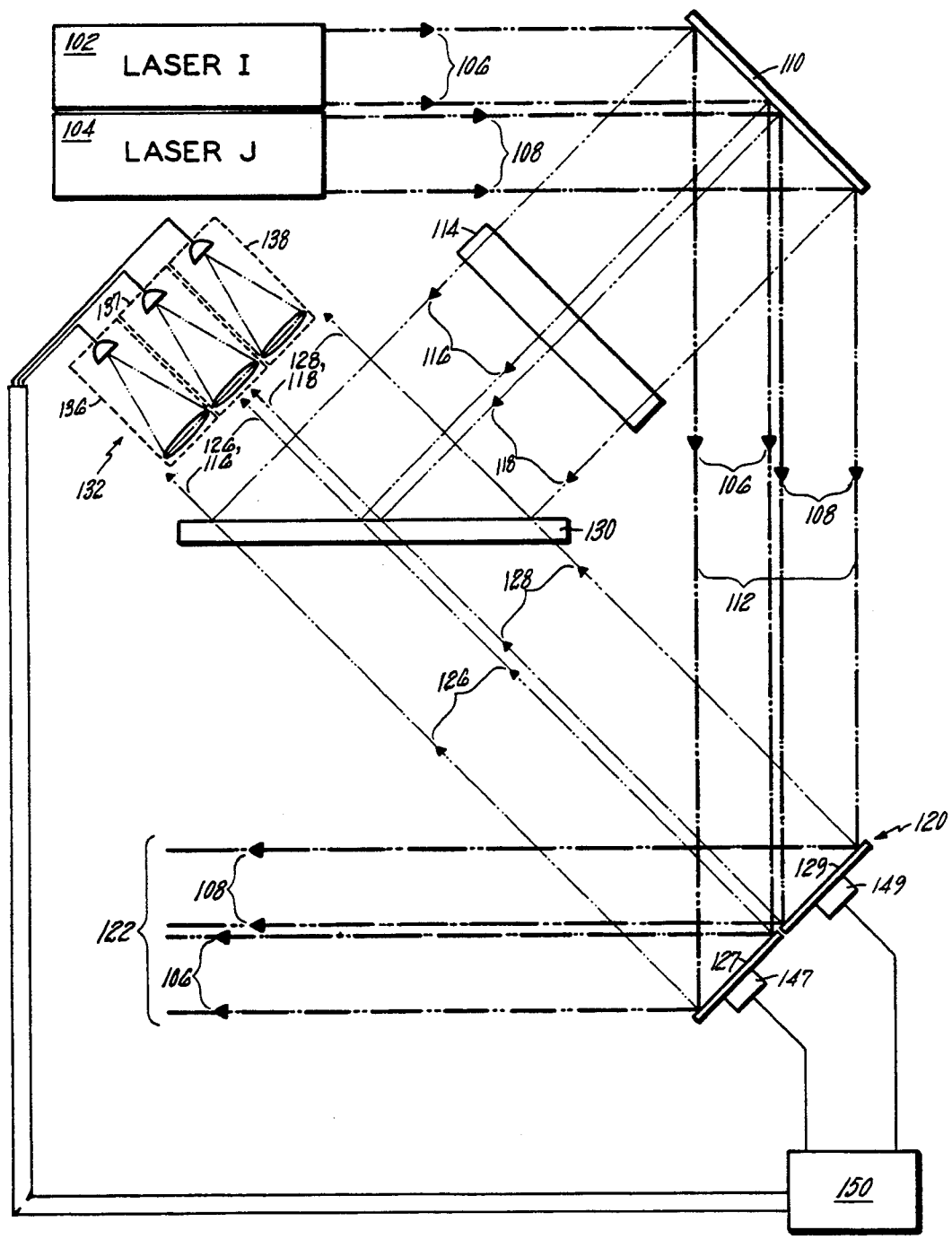
FIG. 1 illustrates an overall view of a multi-laser system employing the present invention.

In FIG. 1, a simplified view of a multi-laser, multi-mirror array is shown, in which laser 102, labeled laser I and laser 104, labeled laser J, are two separate lasers out of an array of several lasers which combine to produce a total output beam. Laser 102 produces beam 106 and laser 104 produces beam 108. These beams are reflected by turning mirror 110 and continue to adaptive mirror 120 from which they travel as an output beam. Both turning mirror 110 and adaptive mirror 120 contain diffraction gratings etched on the surface to diffract a low power sample beam for analysis and control of the system. When sub-beam 106 strikes turning mirror 110, it generates a sample beam 116 which travels to beam splitter 130 and from that to Hartmann sensor array 132. Similarly, output beam 108 strikes turning mirror 110, produces sample beam 118 which is combined by beam splitter 130 and also directed to Hartmann sensor 132. The remainder of beams 106 and 108 continue through deflected beam 112 to strike adaptive mirror 120. Gratings on the separate portions 127 and 129 of mirror 120 deflect sample beams 126 and 128 respectively which pass through beam splitter 130 and enter Hartmann sensor 132. The gratings on the surfaces of mirrors 110 and 120 are constructed as is known in the art.

The remainder of the beams continue out as output beam 122. The function of mirror 120 is to shape output beam 122 to compensate for distortions introduced by the atmosphere or in lasers 102 or 104; to focus output 122 onto a target; or to steer output beam 122 within a small range to direct the beam at the target. The use of deformable adaptive mirrors in which actuators deform the mirror in order to perform such functions is well known in the art. Mirror 120 may be composed of an array of such deformable mirrors, or it may be composed of an array of rigid mirrors that may be oriented in space through a control system to be described below. If each element 127 or 129 is supported by three actuators, then the element may be tilted in angle or may be moved forward or backward while maintaining the same angular orientation. The mechanisms to control mirror elements 127 and 129 are indicated schematically in FIG. 1 as boxes 147 and 149. The exact form of control device is not relevant to the invention.

In the past, mirrors such as mirror 120 have been single-piece mirrors and beams have necessarily been limited to the diameter mirrors that the technology could provide. In the future, in which very large scale systems are contemplated, the large mirrors in the system must be constructed from an array of smaller mirrors. A small mirror 129 to control beam 108 and a small mirror 127 to control beam 106 are illustrated. The figure has been shown with respect to two beams for simplicity in the drawing. Those skilled in the art will realize that the principles may be readily extended to any number of mirror segments. Each small mirror may be controlled to provide the correct wave front tilt and direction by a Hartmann or other control system, as is known in the art. A new problem is now introduced, however, because the separate segments of mirror 120 must be controlled so that the path length of beam 106 is the same as the path length of beam 108. If this path length control is not done, the output beam will have different portions with different phase and the beam at large distances from the apparatus will therefore not be high quality.

Sample beams 116 and 118 pass through a conventional modulator or chopper 114 which imposes a time dependent variation on the reference beams so that electronic circuits may readily distinguish the reference beam from mirror 110 from the sample beam deflected from mirror 120. The sample beams and reference beams are combined by beam splitter 130 and enter sensor 132 which performs the functions of Hartmann sensors in the past and also solves the piston problem. Sensor 132 includes conventional pairs of lenses and detectors that are indicated as 136 and 138 in the figure and shown in more detail in FIG. 2. Sensor 132 differs from those of the prior art in that an additional lens and sensor element 137 is inserted at the boundary of sample beams 126 and 128. Element 137 provides the additional information needed to solve the pistion problem.

Figure 2:
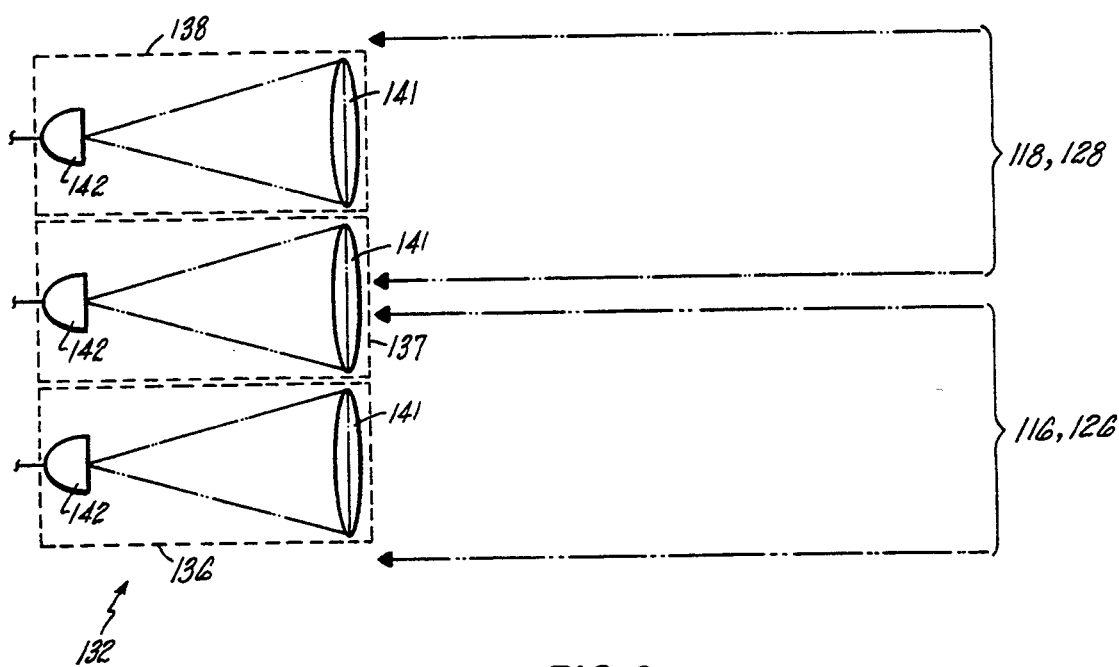
FIG. 2 illustrates a detail of a system in FIG. 1.

A more detailed view is shown in FIG. 2 in which the combined sample beams 116 and 126, which were superimposed by beam splitter 130, pass into subdetector 136 consisting of lens 141 and detector 142, as is conventional. Similarly, superimposed beams 118 and 128 pass through subdetector 138 which is composed cf an identical lens 141 and detector 142. The new subdetector 137 comprising the same lens and detector is shown at the intersection of the two sample beams. The beams are shown in FIG. 2 as non-overlapping, with lens 141 focusing the two beams at detector 142.

In operation, detectors 142, which may be quadrant detectors, in elements 136 and 138 produce signals indicating the deviation of beam spots, focused by lenses 141, from the center of the respective detectors 142. Conventional control circuitry 150 responds to the various signals to compare the difference between the beam spots from beams 116 and 126 and to send control signals to piezo-actuators within element 147 on mirror element 127 to superimpose the beam spot from sample beam 126 on the spot from reference beam 116. Control circuitry 150 may be a digital computer with conventional circuitry to respond to the signals from detectors 142 and from digital inputs to the computer. A similar procedure is followed to correct the tilt of mirror 129 to align beams 118 and 128.

The correction process that produces these tilts will, however, produce two sample beams 126 and 128 which are parallel but in which there is a phase difference of an arbitrary amount. Detector 137 responds to both beams 126 and 128 and thus a phase difference between them will appear at the output of detector 142 of detector 137 as a sinusoidal function of the differential path length between beams 106 and 108 that is caused by displacement of mirrors 127 and 129. This phase difference will go through a complete cycle of $2\pi$ as the path length for beams 106 and 108 varies by one wavelength, and conventional techniques as disclosed in R. Saucedo and E. E. Shiring, "*Introduction to Continuous and Digital Control Systems*", published by the MacMillan Company, New York, 1968, will reduce that phase difference to an integral multiple of $2\pi$. Further conventional techniques as disclosed in U.S. Pat. No. 4,295,741 may eliminate the $2\pi N$ ambiguity and correct the path length for beams 106 and 108 to be exactly equal. The implementation of the present invention may be done in many different ways, as will be evident to those skilled in the art. For example, the system may have a constant-diameter beam, as is shown in the drawing, or it may have an optical train that changes the beam size. Also, modulator 114 may be a dithered mirror, an acousto-optic modulator or any other conventional device. Modulator 114 may be placed in either the reference or output sample beam. The Hartmann sensor elements 136, 137, 138 may use a focusing diffraction grating instead of a lens.

The invention has been disclosed in a system showing only two lasers out of several. Those skilled in the art will have no difficulty in extending the principle of this invention to as many lasers as is desired.

Typically, one laser and its beam path will arbitrarily be selected as a reference and adjacent beam paths will be sequentially adjusted to equal the reference one.

A typical control timing sequence is to correct the mirror elements for tilt, either simultaneously or sequentially, so that beams 106 and 108 are parallel. Then, one beam, 108 say, is used as the reference path length and the other beam path is corrected in length by driving mirror 127 using the signal from overlap detector 137 as the input. Controller 150 will drive the actuators within unit 147 in a manner that is calculated to preserve the correct tilt of beam 106 (nominally moving mirror 127 parallel to the axis of beam 106). Since mirror 127 will have moved slightly during this process, there may be some change in the tilt of beam 106 that is detected in detector 136, so that beam 106 is re-tilted. It is straightforward, either to operate the tilt control loop in alternation with the beam path control loop, or, by proper adjustment of the time constants so the loops do not interfere, to operate them simultaneously.

The Figure is drawn in partially pictorial, partially schematic form. Beam splitter 130 is placed midway between mirrors 110 and 120, but it may be placed anywhere that is convenient and the sample beams transported to it with conventional optics.

The "overlap detector" may be a lens-detector combination, as shown in the figure or it may be any number of combinations that will be evident to those skilled in the art in the light of this disclosure.

We claim:

1. An apparatus for generating a combined optical output beam comprising:

at least two lasers for generating at least two component beams;

a composite mirror having at least two composite mirror elements;

means for directing said at least two component beams onto corresponding ones of said at least two composite mirror elements whereby an output beam having at least two component output beams is reflected from said at least two composite mirror elements;

control means for controlling the orientation in space of at least one of said at least two composite mirror elements;

reference sample means for forming at least two reference sample beams from and corresponding to said at least two component beams;

output sample means for forming at least two output sample beams from and corresponding to at least two component output beams reflected from said at least two composite mirror elements; and detector means for detecting said at least two reference sample beams and said at least two output sample beams and for passing signals corresponding to said reference beams and output beams to said control means, whereby said control means controls said at least one of said at least two composite mirror elements so that said output beam is configured in a predetermined manner; characterized in that:

said apparatus further includes at least one overlap detector means for detecting radiation simultaneously from two of said at least two component output beams, whereby said radiation from said two component output beams interferes in said detector means to produce an overlap phase signal depending on a first path length difference between a first optical path of one of said component output beams and a second optical path of another of said at least two component output beams; and second control means connected to said overlap detector means for further controlling at least one of said at least two composite mirror elements to reduce said first path length difference to zero.

2. An apparatus according to claim 1, further characterized in that said overlap detector means comprises an optical means for combining radiation from two of said at least two component output beams and directing said radiation to a common focus on an optical detector.

* * * * *